United States Patent Office 3,452,116
Patented June 24, 1969

3,452,116
FLAME RETARDANT POLYGLYCIDYL ETHERS OF TETRAKIS(DIHALOHYDROXYPHENYL) ETHANE AND PROPANE
Carl G. Schwarzer, Walnut Creek, Calif., assignor to Shell Oil Company, New York, N.Y., a corporation of Delaware
No Drawing. Filed May 25, 1966, Ser. No. 552,714
Int. Cl. C08g 30/04, 45/00; C09k 3/28
U.S. Cl. 260—830        8 Claims

ABSTRACT OF THE DISCLOSURE

Flame retardant epoxy resins are disclosed. These resins comprise polyglycidyl ethers of tetrakis(dihalohydroxyphenyl)ethane and propane.

---

This invention relates to flame retardant epoxy resin compositions.

Epoxy resins are well known and extensively used in preparing a great variety of castings, foams, laminates and the like. These resins such as the glycidyl polyethers of polyhydric phenols have outstanding properties such as weather and chemical resistance, hardenss, durability and the like. However, one of the major drawbacks of resins of this type is their susceptibility to burning when exposed to flame or sufficently high heat thereby restricting their use where flame retardancy is necessary or desired. Flame retardancy is especially desirable in resin products housing electronic devices and the like where there is danger of possible heat or electrical discharge causing fire.

A number of available flame retardant material such as phosphates, metal carboxylate salts or inorganic compositions are useful in reducing the flammability of epoxy res-in compositions where incorporated therein. However, since these flame retardants do not enter into the cured resin molecular structure or must be cured by a different material than that used to cure the epoxy resins, their use restricts the homogeniety of the cured resin structure or at least makes co-curing difficult.

In order to overcome these disadvantgaes, halogen containing epoxy resins have been used in preparing cured resin products in which self-extinguishing or flame retardant characteristics are desired. The incorporation of the flame retardant epoxy resins into epoxy resins which would otherwise easily ignite and burn is especially suitable since the different types of epoxy resins can be co-cured with the same curing agent. In addition such compositions are very desirable since the flame retardant agent is itself incorporated into the polymer structure of the cured product.

Although a number of the halogenated epoxy resins and compositions containing them have many desirable physical properties it has been found that when ignited these products are somewhat undesirable. More specifically, if such cured resin products are ignited, they decompose in a vigorous manner while giving off copious amounts of noxious and corrosive fumes and gases until the flame is extinguished. The fumes and gases are both hazardous to the health of any persons in the vicinity and corrosive to metallic materials in the area. In addition, the initial vigorous burning is such that non-flame retardant materials close by are likely to become ignited by the flames or heat. It is also found that when such compositions are exposed to certain critical temperature, very extensive molecular decomposition of the flame retardant resin molecules results leaving little if any residue. This decomposition is rapid even to the extent of being violent or explosive in nature and also causes large quantities of gases and fumes to be released with practically total destruction of the article containing the resins.

According to the present invention there are provided flame retardant epoxy resins which when ignited do not burn vigorously or violently until the self-extinguishment of the flame takes place. In addition, the flame retardant epoxy resins of this invention are relatively stable and do not completely decompose at the temperatures as do the flame retardant epoxy resins used heretofore.

The novel flame retardant epoxy resins of this invention are halogen containing polyglycidyl ethers of alpha, alpha, omega, omega-tetrakis(hydroxyaryl)ethane or propane having 7–8 halogen atoms per molecule. These polyglycidyl ethers are obtained by reacting a halogen substituted tetraphenol with an epoxy-halo-substituted alkane in an alkaline medium. The halogens may be chlorine or bromine and are substituted on the aryl portions of the molecule.

Useful tetraphenols for preparing the glycidyl ethers include 1,1,2,2 - tetrakis(3,5-dichloro-4-hydroxyphenyl) ethane, 1,1,2,2 - tetrakis(3,5-dibromo-4-hydroxyphenyl) ethane, 1,1,3,3 - tetrakis(3,5-dichloro-4-hydroxyphenyl) propane and 1,1,3,3 - tetrakis(3,5-dibromo-4-hydroxyphenyl)-propane, 1,1,2,2-tetrakis(3,5-dichloro-2-hydroxyphenyl)ethane, 1,1,2,2 - tetrakis(3,5-dibromo-2-hydroxyphenyl)ethane, etc.

These tetraphenols are known compounds and may be obtained by condensation of a dialdehyde with a phenol. The condensation product is obtained by reaction of phenol and dialdehyde using a substantial excess of the phenol over the stoichiometric proportions of four moles of the phenol per mole of dialdehyde followed by saturating the mixture with hydrogen chloride. The phenol condensates with the dialdehyde so that a terminal carbon atom is linked to the ortho or para-nuclear carbon atom of the phenol. Generally, a reaction product will be mixtures of the ortho- and para-directed phenols with the para linked products present in major amounts.

The tetraphenol is then brominated or chlorinated by reaction with bromine or chlorine by methods well known in the art. The halogens will usually be substituted on the ortho positions of the aryl portions of the molecule with respect to the phenolic hydroxyl group.

The halogen containing polyglycidyl ethers are then prepared by reacting the halogenated tetraphenols with epichlorohydrin or other haloepoxy-substituted alkane such as epibromohydrin, 1,4-dichloro-2,3-epoxybutane and the like. Epichlorohydrin is preferred due to its availability and reactivity. The reactants should be used in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the tetraphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting tetraphenol, or a small excess thereof such as 3% to 5%. Upon completion of the caustic addition and the etherification reactions, unreacted epichlorohydrin is separated by distillation. To the residue consisting primarily of the polyglycidyl ether and salt is added an organic solvent such as a mixture of equal volumes of toluene and butanone. This solvent mixture dissolves the ether, but not the salt which is removed by filtration. The filtrate is then distilled to separate the solvent leaving the desired polyglycidyl ether.

The flame retardant and highly stable compounds of the invention may be represented by the formula

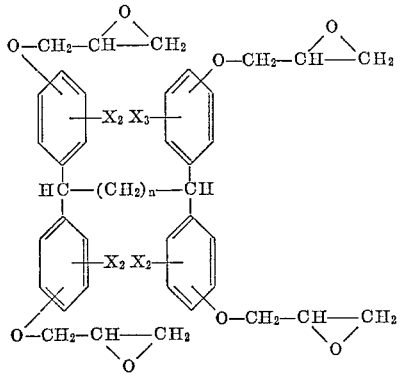

wherein X is chlorine or bromine and $n$ is zero or one. It is not known exactly why these flame retardant materials are quite stable as compared to other halogen containing epoxy resins. However, it is believed that the molecular stability is due to resonance between the aryl portions of the molecules thereby forming unsaturation or double bonds at the ethyl or propyl positions of the molecule thereby strongly holding the molecule together. However, in similar molecules where the alkyl chain between the two bis-phenolic portions of the molecule is longer, i.e., 2 or more carbon atoms, this stabilizing feature is lost and the molecule takes on features of bisphenolic compounds.

The halogen containing epoxy resins of the invention may be used alone or mixed with other resins and cured to prepare useful flame retardant products. Although a great variety of resins may be compounded with the flame-retardant epoxy resins, it is preferred to use other non-flame retardant epoxy resins since the epoxy resin mixture may be co-cured to form products in which the flame retardant resin is incorporated homogeneously into the cured resin structure.

The non-flame retardant epoxy resins which may be mixed with the flame retardant epoxy resins are preferably polyepoxides having more than one epoxy group

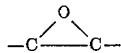

per molecule. The polyepoxides may be saturated or unsaturated, aliphatic, cycloaliphatic, aromatic or heterocyclic and may be substituted with non-interfering substituents such as chlorine, alkoxy groups, etc. They may be monomeric or polymeric.

For clarity, many of the polyepoxides and particularly those of the polymeric type will be described in terms of epoxy equivalent values, which refer to the average number of epoxy group contained in the average molecule. The value is obtained by dividing the average molecular weight of the polyepoxide by the epoxide equivalent weight and as described in U.S. 2,633,458.

If the polyepoxide material is a single compound having all of the epoxy groups intact, the epoxy equivalent value will be an integer, such as 2,3,4, and the like. However, in the case of polymeric polyepoxides the material may contain some of the monomeric epoxide or have some of the epoxy groups hydrated or otherwise reacted and/or contain macromolecules of various molecular weights, so that the epoxy equivalency may be quite low and include fractional values greater than 1.0. Another suitable description of epoxide content of an epoxy compound is in terms of epoxy equivalent per 100 grams.

The monomeric polyepoxide compounds may be exemplified by the following: vinyl cyclohexene dioxide, epoxidized soybean oil, butadiene dioxide, 1,4-bis(2,3-epoxypropoxy)benzene, 1,3-bis(2,3-epoxypropoxy)-benzene, 4,4'-bis(2,3-epoxypropoxy)diphenyl ether, 1,8-bis (2,3-epoxypropoxy)-octane, 1,4-bis(2,3-epoxypropoxy) cyclohexane, 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4-bis(2-hydroxy-4,5-epoxypentoxy) benzene, 1,2,5,6-diepoxy-3-hexene, 1,2,5,6-diepoxyhexane, and 1,2,3,4-tetra(2-hydroxy-3,4-epoxybutoxy)butane.

Other examples of this type include the glycidyl polyethers of the polyhydric phenols obtained by reacting a polyhydric phenol with a great excess, e.g., 4 to 10 mol excess, of a halogen-containing epoxide in an alkaline medium. Thus, polyether A as described in U.S. 2,633,458 to Shokal, which is a concentrate of 2,2-bis (2,3-epoxypropoxyphenyl)propane, is obtained by reacting bis-phenol-A, (2,2-bis(4-hydroxyphenyl)propane) with an excess of epichlorohydrin. Other polyhydric phenols that can be used for this purpose include resorcinol, catechol, hydroquinone, methyl resorcinol, or polynuclear phenols, such as 2,2-bis(4-hydroxyphenyl) butane, 4,4'-dihydrobenzophenone, bis(4-hydroxyphenyl) ethane, and 1,5-dihydroxynaphthalene. The halogen-containing epoxides may be further exemplified by 3-chloro-1,2-epoxybutane, 3-bromo-1,3-epoxyhexane, 3-chloro-1,2-epoxyoctane, and the like. Another very suitable group of epoxides comprises epoxidized cyclohexane compounds containing at least two epoxycyclohexyl rings. Typical of these are 3,4-epoxycyclohexylmethyl-3,4-epoxycyclohexane-carboxylate and the corresponding homologs having alkyl substituents in the cyclohexane rings. These and related compounds are described in substantial detail in U.S. Patents 2,890,194 through 2,890,197 and in U.S. 2,917,469.

Another very suitable group of epoxides comprising the polyglycidyl ethers of tetraphenols is described in U.S. 2,806,016 to Schwarzer. Typical of these is the polyglycidyl ether of 1,1,2,2-tetrakis(hydroxyphenyl)ethane described in Example I of said patent, which has a melting point of about 85° C. and contains 0.452 epoxy equivalent per 100 grams. Examples of the polymeric polyepoxides, include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)ether, the reaction product of sorbitol and bis(2,3-epoxy-2-methylpropyl)ether, the reaction product of pentaerythritol and 1,2-epoxy-4,5-epoxypentane, and the reaction product of bisphenol and bis (2,3-epoxy-2-methylpropyl)ether, the reaction product or resorcinol and bis(2,3-epoxypropyl)ether, and the reaction product of catechol and bis(2,3-epoxypropyl)ether.

A further group of polymeric polyepoxides comprises the hydroxy-substituted polyepoxypolyethers obtained by reacting, preferably in an alkaline medium, a slight excess, e.g., 0.5 to 3 mol excess, of a halogen-containing epoxide as described above, with any of the aforedescribed polyhydric phenols, such as resorcinol, catechol, bis-phenol, bis(2,2'-dihydroxy-dinaphthyl)methane, and the like.

Also included within this group are the polyepoxide polyethers obtained by reacting, preferably in the presence of an acid-acting compound, such as hydrofluoric acid, one of the aforedescribed halogen-containing epoxides with water or a polyhydric alcohol, such as glycerol, propylene glycol, ethylene glycol, trimethylene glycol, butylene glycol, and the like, and subsequently treating the resulting product with an alkaline component as described in U.S. Patent No. 3,058,921 to Pannell.

Other polymeric polyepoxide compounds include the polymers and copolymers of the epoxy-containing monomers possessing at least one polymerizable ethylenic linkage. When such monomers are polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, butadiene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly (2,3-epoxypropyl crotonate), allyl 2,3-epoxypropyl ether-styrene copolymer, methallyl 3,4-epoxybutyl ether-allyl benzoate copolymer, poly(vinyl 2,3-epoxypropyl ether), allyl glycidyl ether-vinyl acetate copolymer and poly(4-glycidyloxy-styrene).

Other particularly suitable polyepoxides include the condensation products of polycarboxylic acids, polycarboxylic acid anhydrides and mixtures thereof with from 1.5 to four times the chemical equivalent amount of a polyepoxide containing more than one vic-epoxy group, the equivalent amount referring to the amount needed to furnish one acid group per epoxy group. The preparation of such compounds and the various starting materials from which they can be prepared are described in U.S. 2,970,983 to Newey. A representative general formula of these compounds, when prepared from dibasic acids, is as follows:

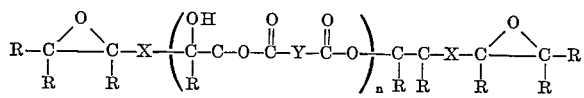

wherein R is hydrogen or hydrocarbon radical, X is organic radical, Y is residue or the dibasic acid and $n$ is an integer and preferably 1 to 10. Particularly preferred are the condensation products of dimer or trimer acids obtained by polymerizing unsaturated fatty acids such as soybean oil fatty acids and the like with diepoxides of the type of polyether A of said U.S. 2,633,458 to Shokal.

A preferred group of epoxy-containing organic materials are the monomeric and polymeric glycidyl polyethers of dihydric phenols obtained by reacting epichlorohydrin with a dihydric phenol in an alkaline medium. The monomeric products of this type may be represented by the general formula

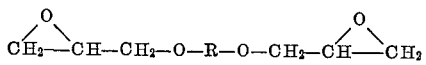

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of materials with one or both of the terminal glycidyl radicals in hydrated form. Molecular weights between about 250 and 900 are preferred.

The aforedescribed preferred glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

Preferred polyepoxy derivatives of dihydric phenols are the reaction products of epichlorohydrin and 2-2-bis(4-hydroxyphenyl)propane. The simplest member of this group is the diglycidyl ether of the phenol, 2,2-bis(2,3-epoxypropoxyphenyl)propane, which is commercially available in the form of liquid concentrates containing from 70% to nearly 100% of the named product. The substantially pure compound has a viscosity of about 40 poises at 25° C., a molecular weight of about 340 and an epoxy value of about 0.59 equivalent per 100 grams, corresponding to an epoxy equivalency of about 2. A typical commercial concentrate of about 70–80% of the compound has a viscosity of about 125 to 175 poises at 25° C., a molecular weight of about 350 (measured ebullioscopically in ethane dichloride), an epoxy value of about 0.50 equivalent per 100 grams and a corresponding epoxy equivalency of 1.75. It is illustrated as Polyether A in U.S. 2,633,458 to Shokal. Other polyepoxy derivatives of dihydric phenols are those of Formula 3 where R stands for $-O-C_6H_4(C_3H_6)C_3H_4-O-$ and $n$ has average values above zero. For example, products in which the average value of $n$ ranges from 0 to about 4 are useful in this invention. Typical of solid products in this range are those having melting points of about 70° C. and about 98° C., molecular weights about 900 and about 1400, and epoxide values of about 0.20 and about 0.103 equivalent per 100 grams, respectively. They are illustrated as polyethers D and E in said Shokal patent.

The epoxide curing agent may be one of a great variety of known epoxy curing agents. Examples of suitable curing agents are alkalies such as sodium or potassium hydroxide; alkali phenoxides like sodium phenoxide; carboxylic acids or anhydrides, such as phthalic anhydride, tetrahydrophthalic anhydride; Nadic methyl anhydride, chlorendic anhydride, pyromellitic anhydride, trimellitic anhydride, succinic anhydride, maleic anhydride, octadecenylsuccinic anhydride, etc. and mixtures thereof; dimer or trimer acids derived from unsaturated fatty acids, 1,20-eicosanedioic acid, and the like; Friedel-Crafts metal halides, such as aluminum chloride, zinc chloride, ferric chloride; or boron trifluoride as well as complexes thereof with ethers, acid anhydrides, ketones, diazonium salts, and those disclosed in U.S. 2,824,083; salts such as zinc fluoborate, magnesium perchlorate, zinc fluosilicate; phosphiric acid and partial esters thereof including n-butyl orthophosphate, diethyl ortho-phosphate and hexaethyltetraphosphate; aliphatic, aromatic and heterocyclic amino compounds, such as, for example, diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperizine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-diethyloctane, dibutylamine, dioctylamine, dinoylamine, distearylamine, diallylamine, dicyclohexamine, methylethylamine, ethylcyclohexylamine, pyrrolidine, 2-methylpyrrolidine, tetrahydropyridine, 2,6-diaminopyridine, diamino-diphenylmethane, p,p'-aminodiphenylsulfone, triaminobenzene, ortho-, para-, and metaphenylene diamine, methylene dianiline, diaminotoluene, diamino-diphenyl, diamino-stilbene, 1,3-diamino-4-isopropyl benzene and the like, and soluble adducts of amines and polyepoxides and their salts, such as described in U.S. 2,651,589 and U.S. 2,640,037.

Other effective curing agents which may suitably be employed are the polyamides containing amino and/or carboxyl groups and preferably those containing a plurality of amino hydrogen atoms and prepared by reacting polybasic acids with polyamine such as described in U.S. Patents 2,450,940 and 2,695,908.

Where the flame retardant epoxy resin is to mix with a non-flame retardant resin, the ratio of resins used depends on the extent of fire retardancy desired. Generally, in the mixtures it is desirable to have a ratio of resins such that the bromine content is at least about 14% or a chlorine content is at least about 20–25% by weight of the total composition. In general, the flame retardance of the composition is determined by the amount of halogen present. Although the cured halogen containing resins are flame retardant, they have physical properties which are in some respects inferior to the corresponding unhalogenated resins. Thus, a balance of physical properties and flame retardancy is desirable, which, for each mixture of resins can be readily determined by one skilled in the art.

The amount of curing agent employed in preparing the cured resin products may be varied over a considerable range depending on the curing agents used as is understood by those skilled in the art. Thus, for example, the amine curing agent may be suitably employed in amounts between 1 to 25% by weight of the epoxy resins whereas with the phosphoric acids and esters, amounts between about 1 to 10% by weight are suitable. Where anhydride curing agents are utilized, it may be desirable to add a small amount (0.1–5% by weight) of a promotor such as a tertiary amine, octoate, sulfide, phosphine, etc. to hasten the cure. Curing temperatures between about 0 and 200° C. are suitable.

The compositions of the invention may be used to prepare a great variety of products such as laminates, coatings, castings, adhesives and the like. The compositions may also contain minor amounts of additives such as antioxidants, other flame retardant materials such as octoates, phosphates, etc. pigments or other coloring agents, fillers, and the like.

To illustrate the manner in which the invention is carried out the following examples are given. Unless otherwise specified, parts disclosed are given by weight.

Example I 1,1,2,2-tetrakis (4-hydroxyphenyl)ethane (1000 g., 2.5 moles) was dissolved in a mixture of 1800 ml. of methanol and 1000 ml. of carbon tetrachloride to which solution was added 50 g. potassium bromide. The reaction vessel was purged with nitrogen several times to eliminate oxygen. Bromine (3200 g. 20 moles) was added slowly over a 2 hour period or at such a rate as to avoid venting bromine vapor. The reaction temperature was maintained at about 50° C.±10° C. The volatiles were then removed at atmospheric pressure with heating. After most of the solvent was removed, 2 liters of hot water were added to the product mixture followed by steam distillation. The water was then discarded and 2 more liters of water were added and the mixture steam distilled. The product was then recovered and dried. The product was 1,1,2,2-tetrakis(3,5 - dibromo - 4-hydroxyphenyl) ethane.

A portion of the brominated tetraphenol (500 g.) was dissolved in 500 ml. of methanol and 1750 g. of epichlorohydrin. The solution was heated to 60° C. and 88 g. of sodium hydroxide dissolved in 90 g. of water was added. The reaction mixture was refluxed for ½ hour after which the volatiles were removed at 120° C. and 15 mm. pressure. The product was dissolved in 1000 cc. of methyl ethyl ketone, one liter of aqueous 5% sodium hydroxide was added and the mixture was allowed to reflux for 1 hour at 50° C. The organic phase was separated and washed with 1 liter of 5% aqueous monosodium phosphate solution. The layers were separated and the solvent was removed at 120° C. and 2 mm. pressure. The product recovered had the following analysis: epoxide, eq./100 g., 0.278; hydroxyl, eq./100 g., 0.07, total bromine, percent w. 49.8.

The predominant compound was the tetraglycidyl ether of 1,1,2,2-tetrakis(3,5-dibromo-4-hydroxyphenyl)ethane. This compound was cured with 17.3 phr. diaminodiphenylsulfone at 150° C. for 1 hour and 2 hours at 170° C. The cured resin which contained 42% bromine was self-extinguishing when exposed to flame.

A portion of the cured resin was placed within an electric coil surrounded by an inert atmosphere of nitrogen. The coil was heated at a rate of 7° C./minute. The decomposition of the cured resin was continuously monitored by the use of a hydrogen flame ionization detector which measured the combustible materials released by the pyrolyzing sample. The cured resin of the invention began to thermally decompose at about 250° C. However, at 520° C. when the test was ended, approximately 50% of the cured resin sample remained.

By comparison, a commercially available flame retardant resin diglycidyl ether of 2,2-bis(3,5-dibromo-4-hydroxyphenyl)propane (Epoxy Resin 542—Dow Chemical) was cured in the manner set forth above with 17.2 phr. diaminodiphenylsulfone to give a composition containing about 41% bromine. The cured resin was also pyrolyzed under the same conditions as set forth above. Decomposition of the material began at about 240° C. with violent and extensive decomposition taking place between about 250 and 290° C. At 520° C. there was about 5% residue of the cured resin remaining indicating almost complete decomposition.

Example II (a) A mixture of 50 g. of a flame retardant resin of this invention prepared in Example I, 50 g. of Epon 828 (Shell Chemical Company) a liquid glycidyl polyether prepared by reacting epichlorohydrin and 2,2-bis(4-hydroxyphenyl)propane in an alkane medium and having the following analysis:

Original molecular _____ 380
Hydroxyl content (equiv./100%) _____ 0.06
Epoxide (equiv./100) _____ 0.52–0.55 and 24.5 g. of diaminodiphenylsulfone curing agent was cured for 2 hours at 120° C., 2 hours at 150° C. and 4 hours at 170° C. The mixture had a bromide content of about 19%.

(b) A similar mixture was prepared except that the diglycidyl ether of 2,2-bis(3,5-dibromo-4-hydroxyphenyl) propane was substituted for the bromine containing epoxy resin used above. The amount of bromine in the mixture was also about 19%.

The two cured resins were tested for flame retardancy by the National Electrical Manufacturers Association (NEMA) method which comprises heating a sample of the resin within a coil heated electrically to a temperature of 860° C. until the sample ignites. The ignition time, which is a measure of heat resistance, and the extinction time, which is a measure of flame retardancy were determined.

| | Sample | |
| --- | --- | --- |
| | (a) | (b) |
| Heat distortion, ° C | 188 | 136 |
| Ignition time, NEMA, sec | 84 | 80 |
| Extinction time, NEMA, sec | 7 | 43 |

The results show the superior heat resistance and flame retardant properties of the compositions containing the flame retardant resins of this invention over compositions containing a similar flame retardant epoxy resin and having equal halogen content. In addition, during the time between ignition and flame extinction, the resin (a) burned and fumed in a mild manner when compared with resin (b) which flamed violently and released large amounts of smoke and noxious gases.

The cured resins were also pyrolyzed using the procedure set forth in Example I. After heating to about 520° C. sample (a) had a residue of about 50% while that of sample (b) was 10% of the original weight.

Example III

Resin compositions were prepared using the same materials as set forth in Example II(a) and (b) respectively, with the exception that a sufficient amount of flame retardant resins was used in each case to give a resin mixture containing 25% bromine with mixture (a) containing 47% Epon 828 and 53% of the resin prepared in Example I and mixture (b) containing 57% of the diglycidyl ether of 2,2-bis(3,5-dibromo-4-hydroxyphenyl)propane and 43% Epon 828. The mixtures were cured with diaminodiphenylsulfone as set forth in Example II and tested.

|  | a | b |
| --- | --- | --- |
| Heat distortion, °C | 183 | 173 |
| Ignition time, NEMA, sec | 78 | 75 |
| Extinction time, NEMA, sec | 5 | 24 |

I claim as my invention:

1. A resin selected from the group consisting of a polyglycidyl ether of 1,1,2,2-tetrakis(dihalohydroxyphenyl)ethane and a polyglycidyl ether of 1,1,3,3-tetrakis(dihalohydroxyphenyl)propane, wherein the halogen is bromine or chlorine.

2. A resin of claim 1 having the formula

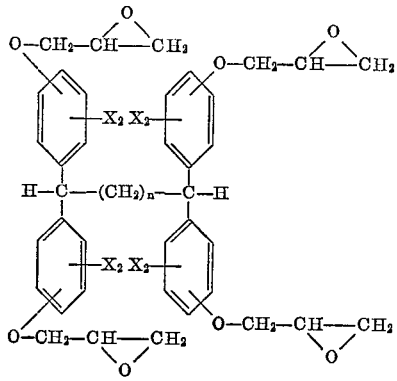

wherein X is chlorine or bromine, and $n$ is zero or one.

3. A resin of claim 1 comprising the polyglycidyl ether of 1,1,2,2-tetrakis(3,5-dibromo-4-hydroxyphenyl)ethane.

4. A resin of claim 1 comprising the polyglycidyl ether of 1,1,3,3-tetrakis(3,5-dibromo-4-hydroxyphenyl)propane.

5. A resin as set forth in claim 1 wherein the polyglycidyl ether is a tetraglycidyl ether.

6. A flame retardant composition obtained by reacting a resin of claim 1 with an epoxy resin curing agent, wherein the halogen content of the total composition, in the case of bromine is at least about 14% by weight or in the case of chlorine is at least about 20% by weight.

7. A flame retardant composition comprising a resin as set forth in claim 1, a dissimilar polyepoxide and an epoxy resin curing agent wherein the halogen content of the total composition, in the case of bromine is at least 14% by weight, or in the case of chlorine is at least 20% by weight of the total composition.

8. A composition as set forth in claim 7 wherein the dissimilar polyepoxide is a polyglycidyl ether of a polyhydric phenol.

References Cited

UNITED STATES PATENTS

| | | | |
| --- | --- | --- | --- |
| 3,016,362 | 1/1962 | Wismar | 260—830 |
| 3,058,946 | 10/1962 | Nametz | 260—87 |
| 3,218,369 | 11/1965 | Hinkley | 260—47 |
| 3,218,370 | 11/1965 | Fry | 260—831 |
| 3,268,619 | 8/1966 | Nametz | 260—47 |
| 3,271,350 | 9/1966 | Vertnik | 260—47 |
| 3,280,216 | 10/1966 | Partansky | 260—831 |

OTHER REFERENCES

Modern Plastics, Kystra et al., 37, 40.9, pp. 131, 132, 134, 133, 190 (1960).

MURRAY TILLMAN, *Primary Examiner.*

PAUL LIEBERMAN, *Assistant Examiner.*

U.S. Cl. X.R.

260—47, 2, 836